Nov. 9, 1937. L. D. SOUBIER 2,098,435
GLASSWARE FORMING MACHINE
Filed Jan. 24, 1935 3 Sheets-Sheet 1

Leonard D. Soubier
INVENTOR.

BY J. F. Rule
ATTORNEY

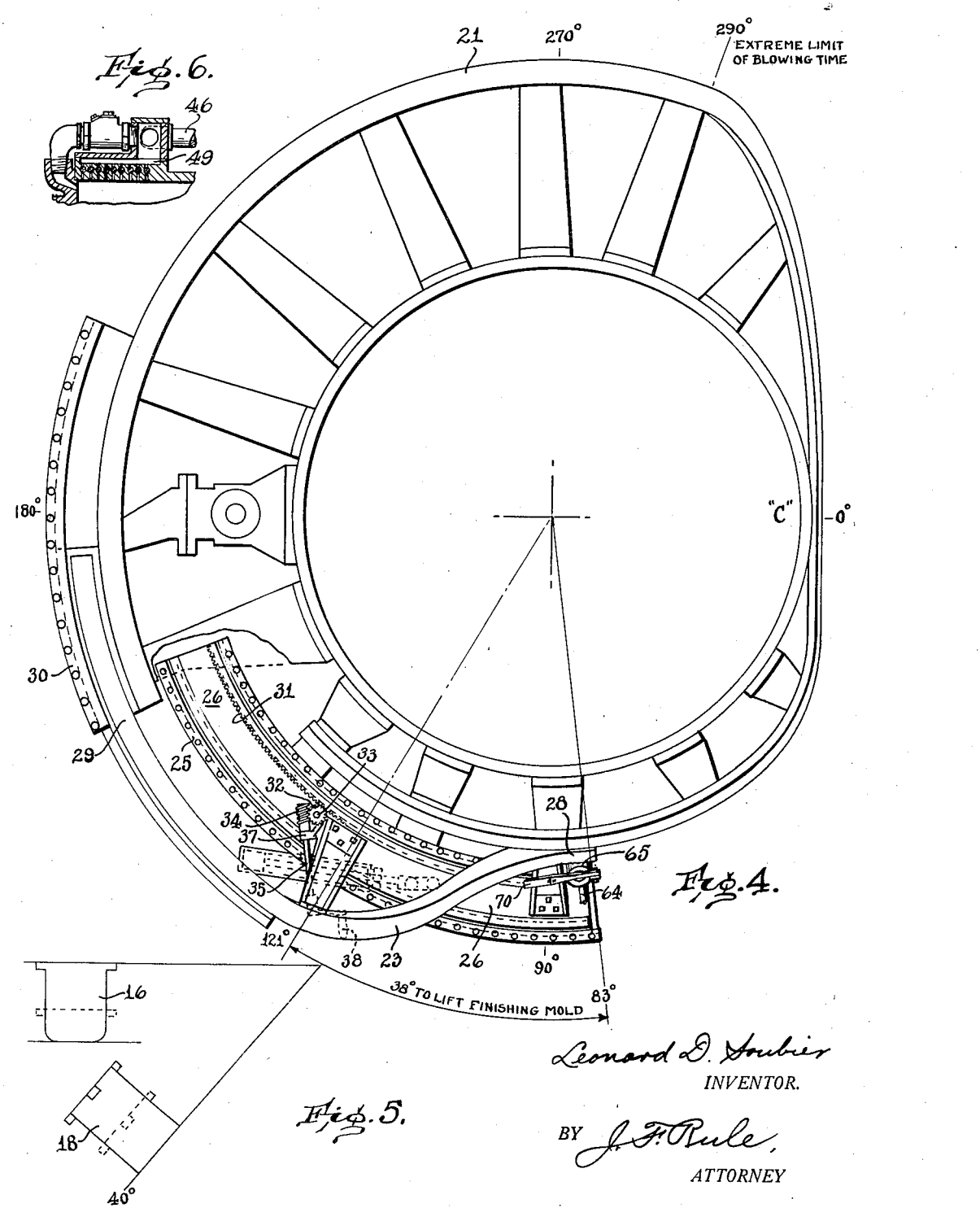

Nov. 9, 1937.  L. D. SOUBIER  2,098,435
GLASSWARE FORMING MACHINE
Filed Jan. 24, 1935   3 Sheets-Sheet 3
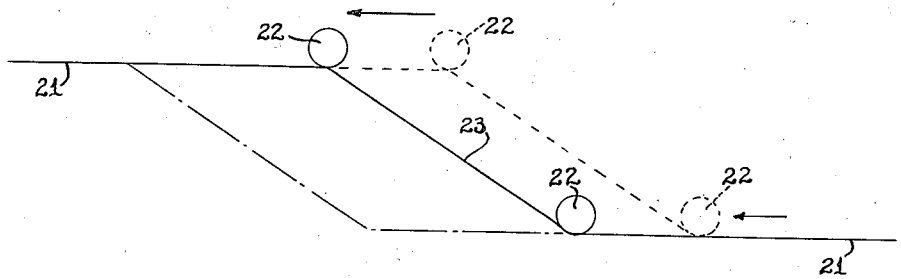
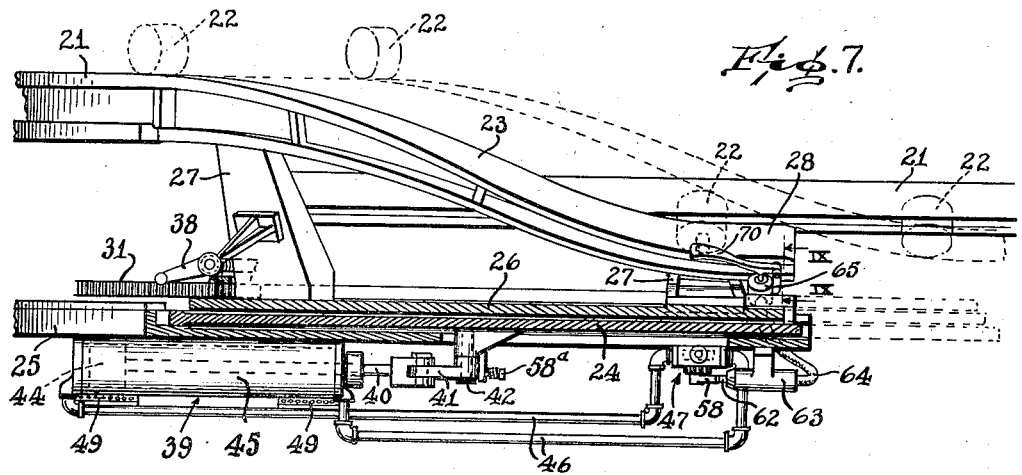
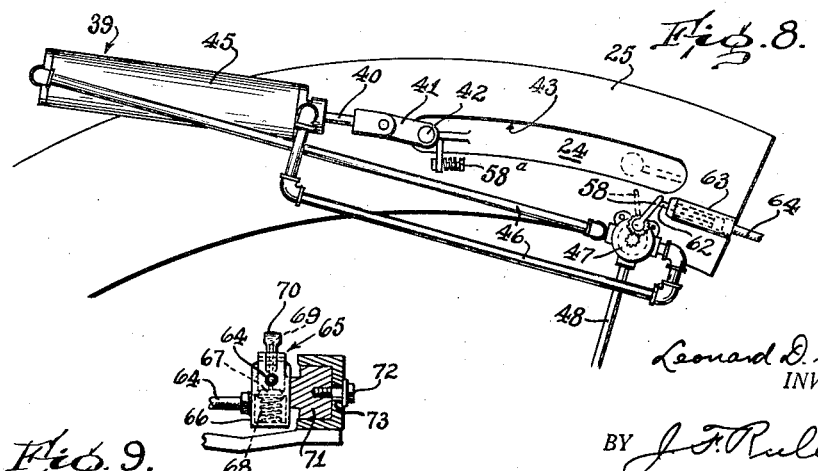

Patented Nov. 9, 1937

2,098,435

UNITED STATES PATENT OFFICE 2,098,435

GLASSWARE FORMING MACHINE

Leonard D. Soubier, Toledo, Ohio, assignor to Owens-Illinois Glass Company, a corporation of Ohio Application January 24, 1935, Serial No. 3,228

17 Claims. (Cl. 49—9)

The present invention relates to improvements in machines for forming hollow glass articles and more particularly to means for regulably controlling the point at which blanks or parisons are transferred from the blank molds to the finishing molds and the time required for such transferring operation.

In the production of hollow glass articles, such for example, as bottles and jars, on machines of the well known Owens type, mold charges of molten glass are gathered by suction into blank molds and therein transformed into blanks or parisons. Briefly, the steps involve bringing the open lower end of a suction blank mold (consisting of partible body blank and neck molds) into charge gathering contact with the surface of a supply body of molten glass and exhausting the air from the blank mold for the purpose of filling the cavity with molten glass or a mold charge. This mold charge is then severed from the supply body of glass by a severing device which ordinarily operates to close the mold following the severing operation. Thereafter the usual neck forming plunger is retracted from engagement with the glass to permit the application of a short puff of air under pressure through the neck to the plunger formed opening in the mass of glass for the purpose of compacting the mold charge and transforming it into a blank or parison. Immediately thereafter, the charge severing device is moved to its normal idle position at one side of the mold and the body blank mold is opened. This leaves the blank or parison suspended bare from the neck mold and connected thereto only by a comparatively slender body of very hot and plastic glass enclosed in a thin chilled skin or enamel. The corresponding finishing mold, which in the Owens type machine, is arranged immediately below the blank mold, is then raised and closed about the blank. Incidentally all of these operations take place during continuous horizontal travel of the molds. The bottom plate which constitutes a part of the finishing mold unit is brought into supporting engagement with the bottom end of the blank prior to completion of the mold closing operation. Such raising of the finishing mold unit is accomplished by means of a stationary track (known as the "serpentine" track) which extends entirely around the machine and operates during rotary movement of the molds through the blank transferring zone to gradually raise the finishing mold to a position or level at which it may be closed about the blank and brought into cooperative engagement with the neck mold. This "serpentine" track is stationary and nonadjustable and for this reason the point at which the finishing mold is raised, cannot be changed to meet the varied requirements of commercial production of glass articles. Because of these conditions and the fact that a machine, for economic reasons must be designed to produce a comparatively wide range of sizes and shapes of articles, the mold elevating section of the "serpentine" track is located at a point to permit the longest necessary period of blank transfer time which will be encountered in normal operation of the machine despite the fact that for every different size bottle there should be a different blank transfer point and time. Due to these conditions which are ideal and completely satisfactory for only the largest size and type of ware to be produced on a particular machine, it becomes necessary to over-expose all other sizes produced on the machine to the detrimental effects of an excessive degree of contact with the atmosphere, distortion by centrifugal force, and sagging or stretching of the blanks under their own unsupported weight. It will be obvious that centrifugal force does result in serious distortion of the blanks or parisons and thereby creates defects in the finished articles when consideration is given the fact that these machines are rotated anywhere from two and one-half to eight revolutions per minute (or from approximately one hundred four to three hundred thirty-five feet per minute peripheral speed) and the blanks or parisons are in a highly plastic state and attached to the supporting means only by a comparatively slender body of very soft glass.

Such unavoidable over-exposure necessitates excessive chilling of the blank by using relatively cool glass at the outset and extension of the period to contact of the glass with the body blank mold for heat extraction, to insure retention of the blank shape during the transferring operation which may require anywhere from 90° to 130° of rotation of the machine. Consequently, it is clear that with present operations the smaller the article, the more out of proportion is the period of exposure of the blank. This condition in which the blank must be chilled sufficiently to be self supporting during the transfer operation positively precludes any possibility of producing small thin-walled bottles etc., for the obvious reason that the glass has become too viscous to be worked properly.

At the present time excessive distortion of the blanks resulting from downward stretching from the neck mold or the action of centrifugal force, is counteracted to some degree by changing the temperature and viscosity or the "working range" of the glass in the supply body, the degree of such variations being governed by the size and shape of the blank or parison. Incidentally, the temperature and viscosity necessary to insure satisfactory transfer of the blanks or parisons from the blank mold to the finishing mold, in so far as distortion is concerned, may and generally does not provide anywhere near the ideal conditions essential to proper working of the glass which might well exist except for the above described circumstances involved in this blank transferring operation. In other words, it would be far more satisfactory to operate with glass having an ideal temperature and "working range" as determined by the specific requirements of the ware being produced and the molds employed, and the resultant ware would be of a much higher quality if the time and point of transfer of the blank to the finishing mold were advanced and shortened proportionately to the decrease in the size of the articles being produced. Moreover, far greater production speeds could be obtained along with the improved quality.

One important step in the operation of an Owens type machine is what is known as an "open air puff" which involves the introduction of a blast of air under pressure into the neck end of the blank while it is suspended bare from the neck mold during the transferring operation. This puff is primarily for the purpose of creating a teat of hot glass at and protruding from the bottom end of the blank, said teat when brought into contact with the bottom plate tending to spread out and envelop the glass which has been chilled by the knife and thereby assisting materially in elimination of the scar ordinarily caused by the cut-off knife. Under present conditions, this puff cannot be applied until the blank reaches a position above the finishing mold bottom plate, the latter serving to limit downward stretching of the blank due to said puff and the weight of the blank. And by this time the weight of the glass has stretched and thereby thinned out the wall about the plunger formed opening in the blank adjacent the neck mold or just where the shoulder of the finished article will develop to such an extent that the following open air puff, so affects the blank that the finished article has very thin and weak shoulders. The present invention overcomes these faults by providing for application of this puff prior to any elongation of the blank and during the period of greatest solidity or density of the glass.

An object of the present invention is to overcome the above noted objections by providing means whereby the point at which the finishing molds are raised and closed about the blanks or parisons, may be adjusted to meet the varied requirements of production and compensate for variations in the size, shape, temperature and viscosity of the glass blanks or parisons. To this end the present invention contemplates the adjustment of the mold lifting section of the "serpentine" track about the axis of the machine, whereby the point at which the blank transferring operation occurs, may be advanced or retarded to meet the specific ideal production requirements of any particular article being produced. Thus, if the blank is small and the glass temperature high, as it should be in a small blank, the transferring operation may be advanced and the period during which the blank is out of control, that is, not supported by a bottom plate or a blank mold, reduced very materially. And on the other hand, if the blank is large and the glass therefor comparatively cool so that it is less subject to stretching and distortion, the transferring operation may be lengthened and/or delayed as conditions require.

Another object is the provision of means whereby upward movement of the finishing molds in the blank transferring zone may be accelerated to thereby reduce the period of exposure of blanks or parisons to the atmosphere and likewise shorten the period of time during which deformation of the blank is uncontrollable on account of its being unsupported except by the neck mold. To this end the illustrated embodiment of the present invention provides for forward movement of the mold raising section of the "serpentine" section of the track in a direction opposite to the direction of and during travel of the molds.

A further object is the provision in a machine of the above character, of means to avoid the necessity for delaying initial upward movement of the finishing mold until the blank mold has completely opened. In accordance with the present invention, these two operations may overlap so that the finishing mold is well on the way to its uppermost position prior to complete opening of the blank mold. Thus, the period of time required for transferring a blank to the finishing mold may be further shortened if necessary and found desirable.

Other objects will be in part apparent and in part pointed out hereinafter.

In the accompanying drawings:

Fig. 4 is a top plan view of the "serpentine" track showing the present invention embodied therein.

Fig. 5 is a diagrammatic view illustrating the relative positions of the blank and finishing molds prior to initial upward movement of the latter.

Fig. 6 is a fragmentary sectional view showing the cushioning means embodied in the motor.

Fig. 7 is a side elevational view with parts in section showing the inclined track section and mechanism for adjusting and reciprocating it.

Fig. 8 is a bottom plan view of the mechanism shown in Fig. 7.

Fig. 9 is a vertical sectional elevational view taken substantially along the line IX—IX of Fig. 7.

Fig. 10 is a diagrammatic view illustrating the fashion in which the inclined track section may be reciprocated to accelerate the speed of raising of the finishing molds.

Figure 1:
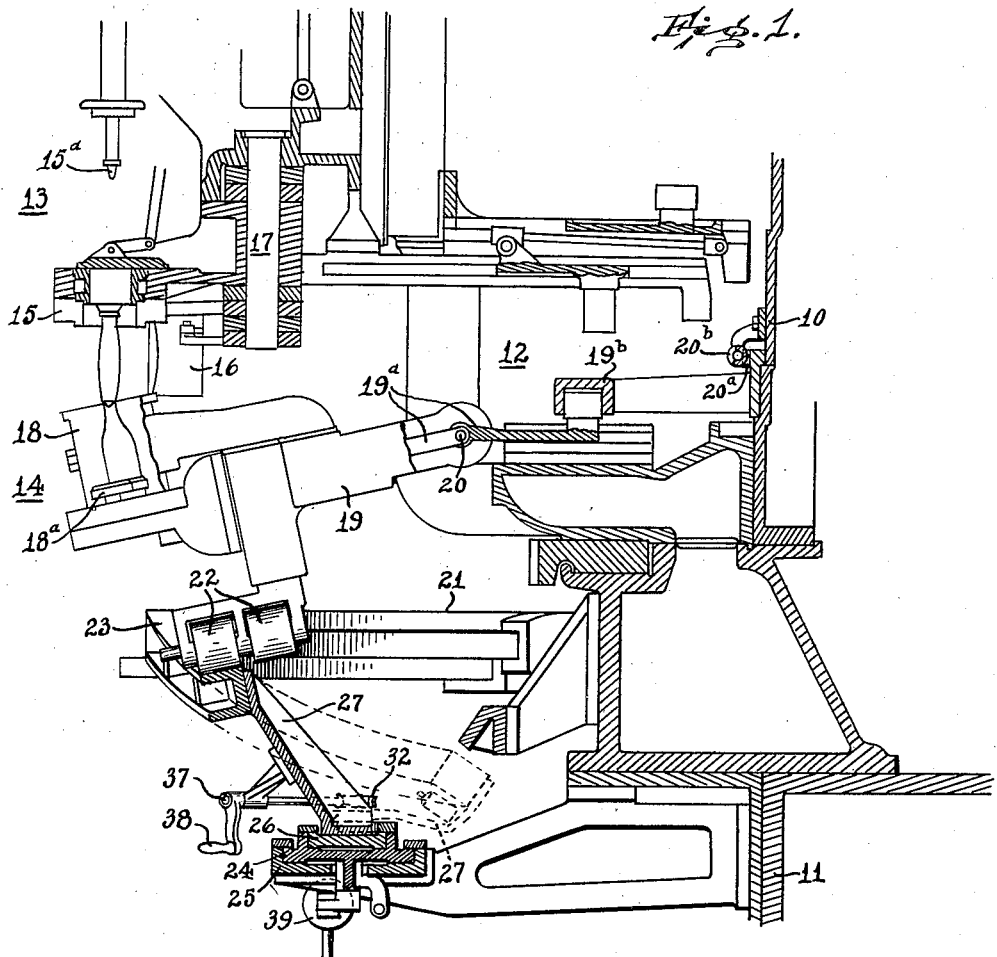
Fig. 1 is a vertical sectional view through one head of an Owens type machine showing the present invention embodied therein.
Figure 2:
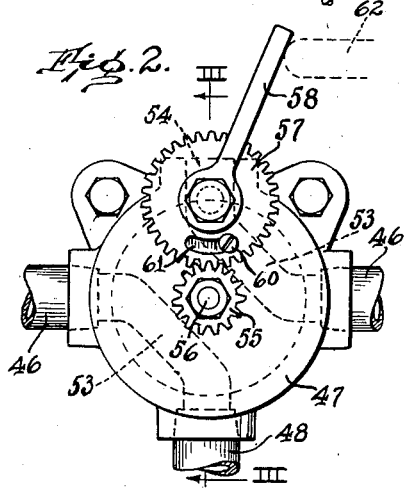
Fig. 2 is a detail elevational view of a trip valve mechanism which controls operation of the motor designed to reciprocate the inclined "serpentine" track section.
Figure 3:
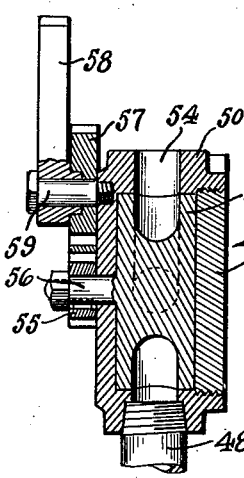
Fig. 3 is a sectional view taken substantially along the line III—III of Fig. 2.

The present invention which is a continuation in part of my copending application Serial Number 723,953, filed May 4th, 1934, is illustrated in connection with an Owens type machine consisting of a stationary central column 10 arising from a stationary base 11 and a rotary mold carriage 12 mounted upon said column which as is the custom, supports an annular series of mold groups, one of which is generally shown in Fig. 1 of the accompanying drawings. This mold group includes a blank mold unit 13 and a finishing mold unit 14 directly therebelow. Each blank mold unit includes a partible neck mold 15 and body blank mold 16, both of which are suitably mounted upon a common vertical hinge pin 17. A plunger 15ª is mounted above the neck mold as is customary.

The finishing mold unit consists of a partible finishing mold 18 and bottom plate 18ª supported on a finishing mold carrier 19 which is arranged below the corresponding blank mold unit and mounted for vertical swinging movement about a horizontal axis 20. Opening and closing of the mold is effected by conventional well known mechanism 19ª which is operated by a stationary adjustable cam 19ᵇ. This cam may be adjusted about the column to advance or retard the time of closing the mold 18. A sector gear 20ª and worm 20ᵇ provide for such adjustment. Swinging movement of the finishing mold carrier is regulated and controlled by means of a stationary track 21 encircling the mold carriage beneath said finishing mold, the latter carrying a pair of rollers 22 on its lower side. One roller rides upon this track 21 and the other roller is adapted to ride upon an adjustable section of the track as will appear hereinafter. This track, which is generally known as a "serpentine" track, is of the usual contour and provides for lowering of the finishing mold as it moves past the blank mold charging zone and elevation of said finishing mold in the blank transferring zone. Elevation of the finishing mold to a position in which it may cooperate with the neck mold 15 in enclosing a blank or parison, is obtained by means of an inclined track section 23.

As brought out heretofore, adjustment of the position of the inclined track section 23 about the axis of the machine and forward movement of this section in a direction opposite that in which the mold is traveling, are desirable in order that the finishing mold may be raised at predetermined variable points, and if desired, in an exceptionally short period of time. To this end the structure involved consists of an arcuate slide 24 mounted in a horizontal arcuate slideway 25 concentric with the axis of the machine and supporting a carrier plate 26 upon which the inclined track section 23 is mounted, the latter being connected to said carrier by means of arms 27 or brackets. Incidentally, it will be observed that the lower forward end 28 of the inclined track section 23 which is disposed in proximity to the stationary portion of the "serpentine" track 21 is extended along side of the latter for a short distance and in effect forms a continuation of the roller engaging surface of the stationary part of the track 21. The opposite end 29 of said section 23 is horizontally disposed and slidingly supported in a slideway 30 which is concentric with the adjacent portion of the "serpentine" track and axis of the machine.

For the purpose of advancing or retarding the operating position of the inclined track section 23, and thereby adjusting the point of blank transfer, but not accelerating the speed of transfer, substantially the following mechanism is employed. An arcuate rack bar 31 is mounted upon the inner margin of the slide 24 and meshes with a worm gear 32, the latter mounted upon a vertical shaft 33 rising from one end of the carrier plate 26. This worm gear runs in mesh with a worm 34 which is mounted at the inner end of a shaft 35, said shaft being journaled in a bearing 37 and having a hand crank 38 attached to its outer end. By manipulating the hand crank 38, the carrier plate 26 and inclined track section 23 mounted thereon, may be adjusted at will relative to the slide 24 to accurately predetermine the beginning of the finishing mold raising operation.

Acceleration of the speed of raising the finishing mold independently of advancing or retarding the point at which the mold is raised, is obtained by advancing the "serpentine" track section 23 during normal travel of the mold about the axis of the machine. Such forward movement of the track section 23, as explained heretofore, may be utilized to materially shorten the period of time the blank or parison is out of positive control and permit running of the glass at a much higher temperature than would be possible if such acceleration were not employed. The illustrated mechanism for so moving the "serpentine" track section includes a horizontal piston motor 39 which is suitably mounted upon the lower side of the slideway 25, said motor including a piston rod 40 connected through a link 41 and a hinge pin 42 to the lower surface of the slide 24. An arcuate slot 43 in the slideway 25 permits the link and hinge pin connection between said piston rod and slide 24. A piston 44 within the motor cylinder 45 is attached to the inner end of the piston rod 40 and adapted to be reciprocated within the cylinder through the introduction of air under pressure into the opposite ends of said cylinder in alternation. Supply pipes 46 connect the opposite ends of the motor cylinder 45 and a reversing valve 47, which in turn is connected to a main supply pipe 48. Incidentally, the pipes 46 are connected to said motor cylinder by way of cushioning devices 49 of conventional form, these devices being adjustable in the usual manner to decelerate the speed of travel of the piston 44 as it approaches the ends of its stroke.

The reversing valve 47 includes a housing 50 within which is mounted a rotary valve body 51, the latter being in the form of a disk retained in said housing by means of a cover plate 52. A pair of opposed parallel conduits 53 in said valve body, open at their opposite ends through ports which are spaced 90° apart about the periphery of said valve body. Thus, while one conduit establishes communication between the main supply pipe 48 and one of the supply pipes 46, the other conduit opens the second supply pipe 46 to the atmosphere by way of an exhaust port 54 which is common to both conduits. Oscillation of said valve body 51 through an angle of 90° is obtained by means of a pinion 55 which is attached to a short shaft 56 forming a part of said valve body, said pinion meshing with a gear 57. This gear is carried by a lever 58, both of which are mounted upon a pin 59 attached to the valve housing 50. A stationary pin 60 extending into an arcuate slot 61 formed in the gear 57, limits the extent of oscillation of the valve body 51 and insures register of the ports and pipes.

Rocking of the lever 58 for the purpose of reversing the valve 47 is directly controlled by movement of the finishing mold into the blank transferring zone. To this end the mechanism involved consists of an air operated plunger 62 mounted in a cylinder 63 which in turn is connected to a source of supply of air under pressure by means of pipes 64 and a trip valve 65. Return of the lever to its original position is obtained by engagement with an arm 58ª carried by and movable with the slide 24. This trip valve consists of a housing 66, a valve 67 therein normally held closed by a spring 68, said valve including a stem 69 which projects upwardly through the housing 66 for engagement with a lever 70, the latter adapted to be depressed when it is engaged by one of the rollers 22 on the finishing mold carrier. In order to advance or retard the time at which the "serpentine" track section 23, begins its forward movement to accelerate lifting of the finishing mold, the trip valve 65 is mounted upon a carrier 71 which in turn is adjustably connected to the mold lifting section 23 of the "serpentine" track. Such adjustable connection is obtained by means of a set screw 72 attached to said carrier 71 and projecting through a slot 73 which extends lengthwise in the inclined section 23 of the "serpentine" track.

In operation, the mold carriage 12 rotates continuously and thereby brings the mold group to a charging station C at regular time intervals. At this station the blank mold is lowered into contact with a supply body of molten glass (not shown) in the usual manner. Air is exhausted from the mold in the usual manner and said mold is thereby charged with a measured quantity of molten glass. Thereafter, the blank or parison is completed by the steps described heretofore. In the event the article being produced is quite small, it is desirable and in fact essential to the production of high class ware, to run the glass at a high temperature and close the finishing mold about the blank or parison at the earliest possible moment following opening of the body blank mold. Such early closing of the finishing mold necessitates an advance of the mold raising operation which is obtained by a forward adjustment of the position of the inclined track section 23, this adjustment being effected by operation of the hand crank 38 as brought out heretofore. Acceleration of the upward movement of the finishing mold, in addition to advancing the point at which such elevation begins, is obtained by operation of the air motor 39. As stated heretofore, operation of the motor 39 is initiated by engagement of one of the rollers 22 with the lever 70 of the trip valve 65. By this procedure, the blank transferring time and point may be so regulably controlled that the glass may be run at an unusually high temperature without encountering any appreciable degree of distortion or over-chilling of the glass.

In connection with this feature reference may be had to Fig. 5 in which blank and finishing molds of one length are shown in full lines and another length in dotted lines. It will be observed that despite the reduced length of the blank mold the elevation of its lower or charging end is not changed. The upper end of the finishing mold however, may change to the extent illustrated. Thus, the shorter the molds, the earlier should be the beginning of the finishing mold raising operation. The present invention provides means for obtaining such early elevation of the mold. These adjustments, together with proper adjustment of the relation between opening of the body blank mold and closing the finishing mold, provide circumstances under which elevation of the finishing mold may begin simultaneously with opening of the body blank mold Modifications may be resorted to within the spirit and scope of the appended claims.

What I claim is:

1. In a glassware forming machine, a mold carriage mounted for rotation about a vertical axis, a blank forming unit thereon including partible cooperating body blank and neck molds, means for forming a blank in said molds, means for then opening the body blank mold and leaving a bare blank suspended from the neck mold, a partible finishing mold arranged below said blank forming unit, mechanism for raising said finishing mold to a position at which it closes about the said blank and means for accelerating the speed of operation of said mechanism to thereby shorten the period of time during which the blank is exposed to the atmosphere.

2. In a glassware forming machine, a mold carriage mounted for rotation about a vertical axis, a blank forming unit thereon including partible cooperating body blank and neck molds, means for forming a blank in said molds, means for then opening the body blank mold and leaving a bare blank suspended from the neck mold, a partible finishing mold arranged below said blank forming unit, mechanism for raising said finishing mold to a position at which it closes about the said blank, means for advancing or retarding the point at which said mechanism is operated to thereby regulably control the point at which the blank is exposed to the atmosphere during its transfer to the finishing mold and means for accelerating the speed of operation of said mechanism to thereby shorten the period of time during which the blank is exposed to the atmosphere.

3. In a glassware forming machine, a mold carriage mounted for rotation about the vertical axis, a mold group on said carriage including partible cooperating body blank and neck molds, means for forming a blank and suspending it bare from the neck mold, a finishing mold unit below the body blank and neck molds, said finishing mold unit including a partible finishing mold, mechanism for opening and closing said finishing mold, a vertically movable carrier therefor, an inclined track adapted to elevate the mold carrier and mold during rotation thereof with the mold carriage, means for advancing or retarding the position of said inclined track about the axis of the machine, to thereby regulably control the blank transferring operation and means for advancing the inclined track during movement of the finishing mold carrier thereover to thereby accelerate elevation of the finishing mold.

4. In a glassware forming machine, a mold carriage mounted for rotation about the vertical axis, a mold group on said carriage including partible cooperating body blank and neck molds, means for forming a blank and suspending it bare from the neck mold, a finishing mold unit below the body blank and neck molds, said finishing mold unit including a partible finishing mold, mechanism for opening and closing said finishing mold, a vertically movable carrier therefor, an inclined track adapted to elevate the mold carrier and mold during rotation thereof with the mold carriage and means for advancing the inclined track during movement of the finishing mold carrier thereover to thereby accelerate elevation of the finishing mold.

5. In a glassware forming machine, a mold carriage mounted for rotation about the vertical axis, a mold group on said carriage including partible cooperating body blank and neck molds, means for forming a blank and suspending it bare from the neck mold, a finishing mold unit below the body blank and neck molds, said finishing mold unit including a partible finishing mold, mechanism for opening and closing said finishing mold, a vertically movable carrier therefor, an inclined track adapted to elevate the mold carrier and mold during rotation thereof with the mold carriage, a carrier for said inclined track mounted for horizontal movement about the axis of the machine, a motor operatively connected to the carrier and adapted to oscillate it and motor controlling means in part carried by said inclined track and adapted to be actuated by engagement with the finishing mold carrier.

6. In a glassware forming machine, a mold carriage mounted for rotation about the vertical axis, a mold group on said carriage including partible cooperating body blank and neck molds, means for forming a blank and suspending it bare from the neck mold, a finishing mold unit below the body blank and neck molds, said finishing mold unit including a partible finishing mold, mechanism for opening and closing said finishing mold, a vertically movable carrier therefor, an inclined track adapted to elevate the mold carrier and mold during rotation thereof with the mold carriage, a carrier for said inclined track mounted for horizontal movement about the axis of the machine, a motor operatively connected to the carrier and adapted to oscillate it, a reversing valve for controlling operation of the motor and mechanism operated by engagement with the finishing mold carrier to actuate said reversing valve.

7. In a glassware forming machine, means for forming a blank and suspending it bare in a transferring zone, a partible finishing mold arranged below the blank, mechanism for raising the finishing mold to a position at which it closes about the said blank and means for accelerating the speed of operation of said mechanism to thereby shorten the period of exposure of the blank to the atmosphere.

8. Mechanism for raising a finishing mold during its travel substantially horizontally through a blank transferring zone, including an inclined track, means for advancing or retarding the position of said track to correspondingly change the point at which the finishing mold is raised in said zone and means for accelerating the speed of operation of said mechanism to thereby shorten the period of exposure of the blank to the atmosphere.

9. Mechanism for raising a finishing mold during its travel substantially horizontally through a blank transferring zone, including an inclined track on which the mold rides and means for moving the inclined track in a direction opposite that traveled by the finishing mold during movement of the latter through the blank transferring zone to thereby accelerate the speed at which said mold is raised.

10. Mechanism for elevating a finishing mold during movement thereof substantially horizontally through a blank transferring zone, said mechanism including an inclined track on which the mold rides, a carrier therefor and a motor adapted to move the track during upward movement of a mold in said zone.

11. Mechanism for elevating a finishing mold during movement thereof substantially horizontally through a blank transferring zone, said mechanism including an inclined track on which the mold rides at times, a carrier therefor, a horizontal slide supporting said carrier, a motor operatively connected to the slide to move it horizontally and means whereby movement of the finishing mold into the transferring zone causes operation of the motor and forward movement of the track to thereby accelerate lifting of the finishing mold.

12. Mechanism for elevating a finishing mold during movement thereof substantially horizontally through a blank transferring zone, said mechanism including an inclined track on which the mold rides at times, a carrier therefor, a horizontal slide supporting said carrier, a motor operatively connected to the slide to move it horizontally, means whereby movement of the finishing mold into the transferring zone causes operation of the motor and forward movement of the track to thereby accelerate lifting of the finishing mold and means for adjusting the carrier and inclined track relative to and in the direction of the length of said slide.

13. Mechanism for elevating a finishing mold during movement thereof substantially horizontally through a blank transferring zone, said mechanism including an inclined track on which the mold rides at times, a carrier therefor, a horizontal slide supporting said carrier, a motor operatively connected to the slide to move it horizontally, means whereby movement of the finishing mold into the transferring zone causes operation of the motor and forward movement of the track to thereby accelerate lifting of the finishing mold, a reversing valve for controlling operation of the motor and a trip valve adapted to be actuated by the finishing mold and in turn control operation of said reversing valve.

14. Mechanism for raising a finishing mold during its travel substantially horizontally through a blank transferring zone, including a cam adapted to raise the said finishing mold, means for advancing or retarding the position of said cam to correspondingly change the point at which the finishing mold is raised in said zone and means for accelerating the speed of operation of said cam to thereby shorten the period of exposure of the blank to the atmosphere.

15. Mechanism for raising a finishing mold during its substantially horizontal travel through a blank transferring zone, including a cam adapted to raise the said finishing mold, means for advancing and retarding the position of said cam to correspondingly change the point at which the finishing mold is raised in said zone and means for moving said cam in a direction opposite that traveled by the finishing mold during movement of the latter through the blank transferring zone to thereby accelerate the speed at which said mold is raised.

16. In a glassware forming machine, means for forming a blank and suspending it bare in a transferring zone, a partible finishing mold arranged below the blank, a cam for moving the finishing mold to a position at which it closes about the said blank and means for accelerating operation of said cam in timed relation with the movement of the finishing mold to said position to thereby shorten the period of exposure of the blank to the atmosphere in the transferring zone.

17. Mechanism for elevating a finishing mold during substantially horizontal movement thereof through a blank transferring zone, said mechanism including a cam for raising said mold, a carrier therefor, a horizontal slide supporting said carrier, a motor operatively connected to the slide to move it horizontally, means whereby movement of the finishing mold into the transferring zone causes operation of the motor and forward movement of the cam to thereby accelerate lifting of the finishing mold and means for adjusting the carrier and cam relative to and in the direction of the length of said slide.

LEONARD D. SOUBIER.